US007375154B2

(12) United States Patent  
Stafford et al.

(10) Patent No.: US 7,375,154 B2
(45) Date of Patent: May 20, 2008

(54) POLYESTER/POLYAMIDE BLEND HAVING IMPROVED FLAVOR RETAINING PROPERTY AND CLARITY

(75) Inventors: Steven Lee Stafford, Gray, TN (US); Mark Edward Stewart, Kingsport, TN (US); Benjamin Bradford Gamble, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 161 days.

(21) Appl. No.: 11/005,288

(22) Filed: Dec. 6, 2004

(65) Prior Publication Data

US 2006/0122306 A1 Jun. 8, 2006

(51) Int. Cl.
*C08L 67/00* (2006.01)
*C08L 77/00* (2006.01)

(52) U.S. Cl. .................. 524/398; 525/425; 528/302; 528/305; 528/308; 528/308.1; 528/308.6

(58) Field of Classification Search ........... 525/425; 524/398; 528/302, 305, 308, 308.1, 308.6
See application file for complete search history.

(56) References Cited

U.S. PATENT DOCUMENTS

| | | | |
|---|---|---|---|
| 3,686,069 A | 8/1972 | Winkler et al. | |
| 4,376,194 A | 3/1983 | Tanaka et al. | |
| 4,501,781 A | 2/1985 | Kushida et al. | |
| 4,536,409 A | 8/1985 | Farrell et al. | |
| 5,021,515 A | 6/1991 | Cochran et al. | |
| 5,034,252 A | 7/1991 | Nilsson et al. | |
| 5,049,624 A | 9/1991 | Adams et al. | |
| 5,075,362 A | 12/1991 | Hofeldt et al. | |
| 5,137,790 A | 8/1992 | Cox et al. | |
| 5,159,005 A | 10/1992 | Frandsen et al. | |
| 5,194,478 A | 3/1993 | Frandsen et al. | |
| 5,211,875 A | 5/1993 | Speer et al. | |
| 5,239,016 A | 8/1993 | Cochran et al. | |
| 5,258,233 A | 11/1993 | Mills et al. | |
| 5,266,233 A | 11/1993 | Houghton et al. | |
| 5,266,413 A | 11/1993 | Mills et al. | |
| 5,281,360 A | 1/1994 | Hong et al. | |
| 5,302,430 A | 4/1994 | Ardechir et al. | |
| 5,314,987 A | 5/1994 | Kim et al. | |
| 5,340,884 A | 8/1994 | Mills et al. | |
| 5,639,815 A | 6/1997 | Cochran et al. | |
| 5,641,825 A | 6/1997 | Bacskai et al. | |
| 5,834,079 A | 11/1998 | Blinka et al. | |
| 5,866,005 A | 2/1999 | DeSimone et al. | |
| 5,866,649 A | 2/1999 | Hong et al. | |
| 5,889,093 A | 3/1999 | Hatakeyama et al. | |
| 5,955,527 A | 9/1999 | Cochran et al. | |
| 6,083,585 A | 7/2000 | Cahill et al. | |
| 6,239,210 B1 | 5/2001 | Kim et al. | |
| 6,239,233 B1 | 5/2001 | Bell et al. | |
| 6,248,258 B1 | 6/2001 | Tomita et al. | |
| 6,254,803 B1 | 7/2001 | Matthews et al. | |
| 6,288,161 B1 | 9/2001 | Kim et al. | |
| 6,319,575 B1 | 11/2001 | Takashima et al. | |
| 6,346,307 B1 | 2/2002 | Al Ghatta et al. | |
| 6,417,262 B1 | 7/2002 | Turner et al. | |
| 6,423,396 B2 | 7/2002 | Hashimoto | |
| 6,444,283 B1 | 9/2002 | Turner et al. | |
| 6,544,611 B2 | 4/2003 | Schiraldi et al. | |
| 6,689,437 B1 | 2/2004 | Ubara et al. | |
| 6,777,479 B1 | 8/2004 | Bernard et al. | |
| 6,790,499 B2 | 9/2004 | Andrews et al. | |
| 6,793,994 B2 | 9/2004 | Tsai et al. | |
| 6,933,055 B2 * | 8/2005 | Share et al. ............. | 428/474.4 |
| 2002/0002238 A1 | 1/2002 | Laplante et al. | |
| 2002/0002251 A1 | 1/2002 | Ghatta et al. | |
| 2002/0028862 A1 | 3/2002 | Johnson et al. | |
| 2002/0124988 A1 | 9/2002 | Takizawa et al. | |
| 2003/0012896 A1 | 1/2003 | Ching et al. | |
| 2003/0027912 A1 | 2/2003 | Tung et al. | |
| 2003/0039779 A1 | 2/2003 | Share et al. | |
| 2003/0083191 A1 | 5/2003 | Nakajima et al. | |
| 2003/0108702 A1 | 6/2003 | Tung et al. | |
| 2003/0134966 A1 | 7/2003 | Kim et al. | |

(Continued)

FOREIGN PATENT DOCUMENTS

BR 9604228 5/1998

(Continued)

OTHER PUBLICATIONS

Co-pending U.S. Appl. No. 60/633,524, filed Dec. 6, 2004.

(Continued)

*Primary Examiner*—Ana Woodward
(74) *Attorney, Agent, or Firm*—Bernard J. Graves, Jr.; Jennifer R. Knight

(57) ABSTRACT

This invention relates to a polyester/polyamide blend having an excellent gas barrier property. More particularly, the present invention relates to combinations of a polyethylene terephthalate polymer and a polyamide polymer having an excellent gas barrier property and short oxygen scavenging induction periods, where the polyamide polymer has a C:A terminal group concentration ratio of 2:1 or more and a C+A terminal group concentration of at least 0.17 meq/g of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide.

13 Claims, No Drawings

U.S. PATENT DOCUMENTS

| | | |
|---|---|---|
| 2003/0232057 A1 | 12/2003 | Turini et al. |
| 2004/0068055 A1 | 4/2004 | Share et al. |
| 2004/0074904 A1 | 4/2004 | Share et al. |
| 2004/0241468 A1 | 12/2004 | Otaki |
| 2005/0106343 A1 | 5/2005 | Kim et al. |
| 2006/0052504 A1 | 3/2006 | Xiet et al. |
| 2006/0105129 A1 | 5/2006 | Xia |
| 2006/0106146 A1 | 5/2006 | Xia et al. |
| 2006/0106192 A1 | 5/2006 | Xia |
| 2006/0110557 A1 | 5/2006 | Xia et al. |
| 2006/0122306 A1 | 6/2006 | Stafford et al. |

FOREIGN PATENT DOCUMENTS

| | | |
|---|---|---|
| BR | 9604229 | 5/1998 |
| BR | 9604230 | 5/1998 |
| DE | 10123081 | 11/2002 |
| EP | 0546546 | 6/1993 |
| EP | 1655238 | 5/2006 |
| JP | 3193325 | 8/1991 |
| JP | 10007893 | 1/1998 |
| JP | 2000273328 | 10/2000 |
| JP | 2001097342 | 4/2001 |
| JP | 2001179090 | 7/2001 |
| JP | 2001252559 | 9/2001 |
| JP | 2002205721 | 7/2002 |
| JP | 2002302124 | 10/2002 |
| WO | WO 97/28218 | 8/1997 |
| WO | WO 99/20673 | 4/1999 |
| WO | WO 01/90238 | 11/2001 |
| WO | WO 02/072335 | 9/2002 |
| WO | WO 02/072350 | 9/2002 |
| WO | WO 2005/023530 | 3/2005 |

OTHER PUBLICATIONS

Co-pending U.S. Appl. No. 60/633,520, filed Dec. 6, 2004.

Slade, Jr., Philip E., Polymer Molecular Weights, 1975, pp. 31-39, Marcel Dekker, Inc., New York, New York.

DeRoover, Coppens, Devaux, Legras, Momtaz, Contribution to Poly(m-xylylene adipamide) Characterization: Hydrolysis, Condensation, and Oxidation in the Melt, 1996, pp. 1039-1047, John Wiley & Sons, Inc., New York.

Notification of Transmittal of the International Search Report and the Written Opinion of the International Searching Authority, or the Declaration date of mailing Oct. 5, 2006 for the corresponding PCT application.

Notification of Transmittal of the International Search Report and the Written Opinion of the International Searching Authority, or the Declaration Date of Mailing Aug. 23, 2006 for co-pending U.S. Appl. No. 11/292,441, filed Dec. 2, 2005.

Prattipati, et al., "Effect of Compatibilization on the Oxygen-Barrier Properties of Poly(ethylene terephthalate)/Poly(m-xylylene adipamide) Blends", Journal of Applied Polymer Science, 2005, 97, 1361-1370.

International Search Report from co-pending U.S. Appl. No. 11/294,249, filed Dec. 5, 2005 (Eastman reference No. 80100 US 02).

Billmeyer, Jr., Principles of Color Technology, 1981, pp. 25-66.

* cited by examiner

POLYESTER/POLYAMIDE BLEND HAVING IMPROVED FLAVOR RETAINING PROPERTY AND CLARITY

1. FIELD OF THE INVENTION

This invention relates to polyester/polyamide blends having good gas barrier properties. More particularly, the present invention relates to blends of transition metal salts, oxygen scavenging polyamide polymers, and polyester polymers having passive carbon dioxide barrier properties and controlled induction periods for lengthy active oxygen scavenging activity.

2. BACKGROUND OF THE INVENTION

Packaging for food, beverages, cosmetics, medicines, and the like require high barrier properties to oxygen and carbon dioxide to preserve the freshness of the package contents. Blends containing small amounts of high barrier polyamides, such as poly(m-xylylene adipamide), typically known commercially as MXD-6, with polyesters such as poly(ethylene terephthalate), PET, enhance the passive barrier properties of PET.

To further reduce the entry of oxygen into the contents of the package, small amounts of transition metal salts, such as cobalt salts, can be added to the blend of PET and polyamide to catalyze and actively promote the oxidation of the polyamide polymer, thereby further enhancing the oxygen barrier characteristics of the package. The active oxygen scavenging of many blends of oxygen scavenging transition metals and predominantly amine-terminated, low molecular weight polyamides with PET does not begin immediately to a significant extent. On the other hand, active oxygen scavenging of comparable compositions containing oxygen scavenging transition metal/high molecular weight commercial grade MXD-6 blends begins almost immediately, within a few days. The induction period (the period of time from the formation of the article until the time the oxygen transmission rate is significantly reduced) of many low molecular weight, amine-terminated polyamide/cobalt salt blends in PET extends well into the life cycle of a filled package so as to make these blends practically useless as active oxygen scavengers. In some cases, the induction period is so long that no significant oxygen scavenging takes place before the contents of the package are consumed, such that it no longer makes practical sense to refer to an induction period.

In addition to reducing the induction period relative to oxygen scavenging transition metal/predominantly amine-terminated low molecular weight polyamide blends in PET, it would also be yet more desirable to control the induction period. The complete elimination of an induction period is not the most preferred means for reducing the induction period. It would be more desirable to have an induction period of some length of time in order to extend the useful life of oxygen scavenging by the action of the oxygen scavenging transition metal and oxygen scavenger, referred to as the capacity to scavenge oxygen. Containers are usually stored in inventory for a period of time, open to air both inside and out of the container, before they are filled with their designated contents. During the period of storage, oxygen scavenging is not necessary. If the compositions exhibit a very short induction period, oxygen scavenging begins during the period of time when the containers are not filled, with the drawback that the useful scavenging capacity is reduced.

Accordingly, it would be desirable to control the induction period and commence the active oxygen scavenging at about the time the container is filled, typically 2-4 weeks after the article is formed, while providing a shorter induction period than in oxygen scavenging transition metal/low molecular weight amine-terminated polyamide blends in PET.

3. SUMMARY OF THE INVENTION

There is now provided a polyester polymer composition having passive barrier and active oxygen scavenging properties in which the induction period of the active oxygen scavenging system is shortened. In another embodiment, there is provided a polyester composition having passive barrier properties and active oxygen scavenging properties in which the induction period is controlled to have a measure of delay before active oxygen scavenging commences, yet the delay is shorter relative to low molecular weight, amine terminated polyamide/Co blends. There is also provided a polyester polymer composition having high active scavenging properties over a continuous lengthy period of time. The polyester polymer composition comprises:

(A) a polyester polymer comprising:
  (i) a polycarboxylic acid component comprising at least 60 mole % of the residues of terephthalic acid, derivates of terephthalic acid, naphthalene-2,6-dicarboxylic acid, derivatives of naphthalene-2,6-dicarboxylic acid, or mixtures thereof, and
  (ii) a polyhydroxyl component comprising at least 30 mole % of the residues of $C_2$-$C_4$ aliphatic saturated diols, based on 100 mole percent of the polycarboxylic acid residues and 100 mole percent polyhydroxyl residues, respectively, in the polyester polymer; and (B) a polyamide polymer in an amount ranging from 0.10% wt. % to 10.0 wt. %, based on the weight of (A) and (B), having a C:A terminal group concentration ratio of 2:1 or more and a C+A terminal group concentration of at least 0.17 meq/g of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide; and (C) an oxygen scavenging transition metal catalyst. There is also provided a concentrate comprising:

(A) a polyester polymer comprising:
  (i) a polycarboxylic acid component comprising at least 60 mole % of the residues of terephthalic acid, derivates of terephthalic acid, naphthalene-2,6-dicarboxylic acid, derivatives of naphthalene-2,6-dicarboxylic acid, or mixtures thereof, and
  (ii) a polyhydroxyl component comprising at least 30 mole % of the residues of $C_2$-$C_4$ aliphatic saturated diols, based on 100 mole percent of the polycarboxylic acid residues and 100 mole percent polyhydroxyl residues in the polyester polymer; and (B) a polyamide polymer in an amount ranging from 10% wt. % to 50.0 wt. %, based on the weight of (A) and (B), having a C:A terminal group concentration ratio of 2:1 or more and a C+A terminal group concentration of at least 0.17 meq/g of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide.

4. DETAILED DESCRIPTION OF THE INVENTION

The present invention may be understood more readily by reference to the following detailed description of the invention and the examples provided therein.

It must also be noted that, as used in the specification and the appended claims, the singular forms "a," "an" and "the" include plural referents unless the context clearly dictates otherwise. For example, reference to processing or making a "polymer," "preform," "article," "container," or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" is meant that at least the named compound, element, particle, or method step etc must be present in the composition or article or method, but does not exclude the presence of other compounds, catalysts, materials, particles, method steps, etc, even if the other such compounds, material, particles, method steps etc have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence.

A range of numbers includes and expresses all integers and fractions thereof between the stated range. A range of numbers expressly includes numbers less than the stated endpoints and in-between the stated range.

The polyester polymer composition comprises the product produced by the addition of at least the stated ingredients. Included within the composition are blends in which the ingredients can be discretely identified such as might occur when none of the ingredients react with each other or do react with each other but the reaction does not obscure identification of the ingredients. Also included within the composition are reaction products made by combining the ingredients in which the form of the ingredients have been modified as by way of known or unknown reactions occurring among the ingredients once combined or thereafter and it is no longer possible to detect the presence of one or more individual ingredients.

The intrinsic viscosity values described throughout this description are set forth in dL/g units as calculated from the inherent viscosity measured at 25° C. in 60/40 wt/wt phenol/tetrachloroethane.

The polyester polymers of the invention are thermoplastic. The form of the polyester polymer composition is not limited and can include a composition in the melt phase polymerization, as an amorphous pellet, as a solid stated polymer, as a semi-crystalline particle, as a composition of matter in a melt extrusion zone, as a bottle preform, or in the form of a stretch blow molded or extrusion blow molded bottle or other article. The form of the polyester polymer particles is not critical, and such particles are typically formed in the shape of chips, pellets, and flakes.

The measurements of b* color values are conducted according to the following methods. The instrument used for measuring b* color should have the capabilities of a HunterLab UltraScan XE, model U3350, using the CIELab Scale(L*, a*, b*), D65 (ASTM) illuminant, 10° observer, integrating sphere geometry. Sample clarity will dictate which mode is used to test the sample (reflectance or transmission). Pellets are tested under ASTM D 6290 "Standard Test Method for Color Determination of Plastic Pellets" in the reflectance mode. Clear plaques, films, preforms, bottles, and liquids are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object-Color Evaluation." Color is determined on a sample by using its absolute value—the value determined by the instrument.

More particularly, the following test methods can be used, depending upon whether the sample is a ground powder, a preform, or a bottle. Color measurements should be performed using a HunterLab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 10° observer specified. Pellets are measured in RSIN reflection, specular component included mode according to ASTM D6290, "Standard Test Method for Color Determination of Plastic Pellets". Pellets are placed in a 33-mm path length optical glass cell, available from HunterLab, and allowed to settle by vibrating the sample cell using a laboratory Mini-Vortexer (VWR International, West Chester, Pa.).

Preforms having a mean outer diameter of 0.878 inches and a wall thickness of 144 mils, and bottle sidewall sections having a wall thickness of 11.5 to 12 mils are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement. Bottle sidewalls are cut from the bottle and held in place in the instrument using a transmission clamp accessory, available from HunterLab, and duplicate measurements are averaged, whereby each side of the sidewall alternately contacts the sample port.

L*, a*, and b* values measured in transmission mode are somewhat dependent on the sample thickness. Since at one thickness the measured b* has one value and at another thickness the same polyester polymer composition can have a different value, the b* values claimed in preferred embodiments of the invention can be normalized to a thickness of 12 mils+0.5 mils for bottle sidewalls and two 144 mil sections for preforms for a wide variety of different perform and bottle sidewall thicknesses by the following equation:

$$T_h = T_o 10^{-\beta h}$$

$$\beta = \frac{\log_{10}\left(\frac{T_o}{T_d}\right)}{d}$$

where $T_h$=transmittance at target thickness $T_o$=transmittance without absorption $\beta$=Absorption coefficient $T_d$=transmittance measured for sample
h=target thickness
d=thickness of sample wherein the target thickness is 11.5 mils for bottle sidewall (actual thicknesses between 11.5 mils and 12 mils are acceptable) and for preforms the target thickness is a combination of two (2) preform walls each with a target thickness of 144 mils.

The transmittance values are those measured as a function of wavelength in the visible spectrum and integrated according to ASTM E308, "Practice for Computing the Color of Objects by Using the CIE System" in the calculation of the CIE tristimulus values. These calculations, if desired, can be performed in the HunterLab Universal software as part of CMR 2669, available from HunterLab.

We have found that when using low molecular weight amine-terminated polyamides in combination with a cobalt salt acting as an oxidation catalyst blended into polyethylene terephthalate ("PET") polymers, the induction period is rather long. The induction period is determined relative to an identical control except without the presence of an active transmission metal catalyst. Once the control and sample oxygen transmission rates are measured, the induction period of a sample becomes the point in time when the oxygen transmission rate ("OTR") of the sample is reduced by 50% relative to the pseudo steady state oxygen transmission rate of the control. The OTR is tested according to the method described below at 23° C., with 50% relative humidity (RH) external to the package, and about 80% RH internal and expressed in the unit of cc STP/day, where cc STP is the number of cubic centimeters that the transmitted oxygen would occupy at STP (273 K and 1 atm).

The induction period of blends with a low molecular weight amine terminated polyamide can be rather long, even at optimum catalyst and polyamide concentrations of 100-150 ppm cobalt and about 3 wt. % polyamide, respectively. However, blends containing polyethylene terephthalate or polyethylene naphthalate, an oxidation catalyst, and polyamides prepared in such a way as to have a C:A terminal group concentration ratio of 2:1 or more and a C+A terminal group concentration of at least 0.17 meq/g of polyamide polymer, produce polymer compositions exhibiting a much shorter induction period to activate the oxygen scavenging reaction than the same blend using low molecular weight polyamides having a predominantly amine end groups. The induction period can be shortened to about ½ or ⅓ or less of that realized when using the low molecular weight amino terminated version having a C:A ratio of less than 2:1. Not only can the induction period be significantly reduced, but we have found that the induction period can also be controlled or delayed as desired by adjusting the ratio of amine residue end groups to the non-amine residue end groups on the polyamide polymer, as well as the total end group concentration of C+A. Thus, a container can be prepared with immediate passive barrier properties and active oxygen barrier activity after a desired number of days by controlling the end-group types, total number of end groups, and concentrations of the polyamide. A further un-expected advantage was observed by employing the blends of the invention in that the b* color characteristics of the polymers are not sacrificed, and indeed in many instances are improved, in preforms used to make bottles by the use of the polyester polymer compositions of the invention. Thus, containers with lower b* color and high barrier to oxygen can be produced with controlled active oxygen scavenging induction periods for practical applications in packages for beverages, food, cosmetics, personal care products, pharmaceuticals, and the like.

Component (A) of the polyester polymer composition is at least a polyester polymer comprising:
(i) a polycarboxylic acid component comprising at least 60 mole % of the residues of terephthalic acid, derivates of terephthalic acid, naphthalene-2,6-dicarboxylic acid, derivatives of naphthalene-2,6-dicarboxylic acid, or mixtures thereof, and
(ii) a polyhydroxyl component comprising at least 30 mole % of the residues of $C_2$-$C_4$ aliphatic saturated diols, based on 100 mole percent of the polycarboxylic acid residues and 100 mole percent polyhydroxyl residues in the polyester polymer The reaction of a polycarboxylic acid compound with a polyhydroxyl compound during the preparation of the polyester polymer is not restricted to the stated mole % ratios since one may utilize a large excess of poly-ol if desired, e.g. on the order of up to 200 mole % relative to the 100 mole % of polycarboxylic acid used. The polyester polymer made by the reaction does, however, contain the stated amounts of aromatic dicarboxylic acid residues and a $C_2$-$C_4$ aliphatic saturated diol residue.

Derivates of terephthalic acid and naphthalane dicarboxylic acid include $C_1$-$C_4$ dialkylterephthalates and $C_1$-$C_4$ dialkyinaphthalates, such as dimethylterephthalate and dimethyinaphthalate Examples of suitable polyester polymers include polyethylene terephthalate homopolymers and copolymers modified with one or more polycarboxylic acid modifiers in a cumulative amount of less than 15 mole %, or 10 mole % or less, or 8 mole % or less, or one or more polyhydroxyl compound modifiers in an amount of less than 70 mole %, or 50 mole % or less, or 15 mole % or less, or 10 mole % or less, or 8 mole % or less (collectively referred to for brevity as "PET") and polyethylene naphthalate homopolymers and copolymers modified with a cumulative amount of with less than 15 mole %, or 10 mole % or less, or 8 mole % or less, of one or more polycarboxylic acid modifiers or modified less than 70 mole %, or less than 50 mole %, or 15 mole % or less, or 10 mole % or less, or 8 mole % or less of one or more polyhydroxyl compound modifiers (collectively referred to herein as "PEN"), and blends of PET and PEN. A modifier polycarboxylic acid compound or polyhydroxyl compound is a compound other than the compound contained in an amount of at least 60 mole %. The preferred polyester polymer is polyalkylene terephthalate, and most preferred is PET.

Preferably, the polyester polymer contains at least 90 mole % ethylene terephthalate repeat units, and most preferably at least 92 mole %, based on the moles of all repeat units in the polyester polymers.

In addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of modifier dicarboxylic acids useful as an acid component(s) are phthalic acid, isophthalic acid, naphthalene 2,6 dicarboxylic acid if terephthalic acid is present in an amount of at least 60 mole %, terephthalic acid if naphthalene 2,6 dicarboxylic acid is present in an amount of at least 60 mole %, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene 2,6 dicarboxylic acid, and cyclohexanedicarboxylic acid being most preferable. It should be understood that use of the corresponding acid anhydrides, esters, and acid chlorides of these acids is included in the term "polycarboxylic acid". It is also possible for trifunctional and higher order polycarboxylic acids to modify the polyester.

Examples of $C_2$-$C_4$ aliphatic saturated diols include ethylene glycol, propane diol, and butane diol, among which ethylene glycol is most preferred for container applications. In addition to these diols, other modifier polyhydroxyl compound component(s) may include diols such as cycloaliphatic diols preferably having 6 to 20 carbon atoms and/or aliphatic diols preferably having 3 to 20 carbon atoms. Examples of such diols include diethylene glycol; triethylene glycol; 1,4-cyclohexanedimethanol; propane-1, 3-diol and butane-1,4-diol (which are considered modifier diols if ethylene glycol residues are present in the polymer in an amount of at least 60 mole % based on the moles of all polyhydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1, 3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

Preferred modifiers include isophthalic acid, naphthalene dicarboxylic acid, trimellitic anhydride, pyromellitic dianhydride, 1,4-cyclohexane dimethanol, and diethylene glycol The amount of the polyester polymer in the polyester polymer composition ranges from greater than 50.0 wt. %, or from 80.0 wt. %, or from 90.0 wt. %, or from 95.0 wt. %, or from 97.0 wt. %, or from 99.00 wt. %, and up to about 99.50 wt. % based on the combined weight of all polyester polymers and all polyamide polymers. The polyester polymer compositions may also include blends of polyester polymer compositions with other thermoplastic polymers such as polycarbonate. It is preferred that the polyester composition should comprise a majority of the polyester polymer composition of the inventions, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). While in most applications, the polyester polymer composition does not contain any fillers, fibers, impact modifiers, or other polymers which form a discontinuous phase, in an amount of over 5 wt. % based on the weight of the whole composition, some applications, such as ovenable food trays, may contain a greater amount of impact modifiers or other fillers because of cold storage.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

The It.V. of polyester polymer ranges from about at least 0.55, or at least 0.65, or at least 0.70, or at least 0.75, and up to about 1.15 dL/g. The molten polymer from the melt phase polymerization may be allowed to solidify and/or obtain any degree of crystallinity from the melt. Alternatively, the molten polymer can be first solidified and then crystallized from the glass Component (B) of the polyester composition is a polyamide polymer having a C:A terminal group concentration ratio of 2:1 or more and a C+A terminal group concentration of at least 0.17 meq/g (milliequivalents per gram) of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide. By a cumulative total within C is meant that all the terminal end groups selected from carboxylic acids end groups and hydrocarbyl end groups are added, and allows for the presence of only carboxylic acid groups, only hydrocarbyl groups, or a combination of both carboxylic acid and hydrocarbyl end groups. The terminal hydrocarbyl group contains only carbon, hydrogen, and optionally oxygen atoms as components of the end group. An end group is the portion of the molecule past the last amide linkage.

The polyamide polymer is preferably present as a physical blend with the polyester polymer component (A). A variety of methods exist to detect physical blend, and the method selection is not limited. For example, a polyamide can phase separate using conventional separation techniques such as solvent extraction, where at least one of the phases contains the polyamide polymer essentially distinct from another phase containing a polyester polymer component (A).

The amount of polyamide used in the polyester composition will depend upon the requirements of a particular application. In choosing the amount of desired polyamide, consideration is given for factors such as color, the effective reduction in oxygen transmission, and costs, which are each impacted by the amount of polyamide used.

In general, suitable amounts of polyamide, based on the weight of the polyester (A) and the polyamide (B), range from greater than 0.5 wt. %, or greater than 1.0 wt. % and up to about 50 wt. % or less, or 20 wt. % or less, or 10 wt. % or less, or 8 wt. % or less, or 6 wt. % or less, or 3 wt. % or less, based on the weight of (A) and (B). For preform and bottle applications, suitable amounts of polyamide polymers in a polyester container, based on the weight of polyester (A) and polyamide (B), range from 0.50 wt. %, to 10 wt. %, or preferably from 1.0 to 6 wt. %.

If one desires, a concentrate of the polyester composition of the invention can be made and let down into an extruder, such as an injection molding machine, at a desired rate to yield a polyester composition containing the final desired amount of polyamide compound in the finished product, such as a blown bottle. The concentrate contains a concentration of polyamide polymer which is higher than the concentration of polyamide polymer in a container. In this way, a converter retains the flexibility to decide the level of polyamide in the finished product. Thus, there is also provided a concentrate containing the polyester polymer (A), and a polyamide compound (B) in an amount ranging from 10.0 wt %, or at least 15.0 wt. %, or at least 20 wt. %, and up to about 50 wt. %, based on the weight of components (A) and (B).

The method for incorporating the polyamide compound into the finished article is not limited. The polyester/polyamide blends of the present invention involve preparing the polyester and polyamide by known processes. The polyester and polyamide are separately or in combination dried in an atmosphere of dried air or dried nitrogen, or under reduced pressure. The polyester and polyamide are mixed. In one method of incorporation, the polyester and polyamide are melt compounded, for example, in a single or twin screw extruder. After completion of the melt compounding, the extrudate is withdrawn in strand form, and recovered according to the usual way such as cutting. Instead of melt compounding, the polyester and polyamide may be dry-blended and heat-molded or draw-formed into plastic articles.

Alternatively, the polyamide polymer can be added to the melt phase polymerization for making the polyester polymer, preferably in the late stages of polyester manufacture. In the interest of avoiding or limiting the number of reactions which contribute to the formation of color bodies or which may result in the degradation of the polyamide polymer, one may add the polyamide polymer toward the end of the melt phase reaction process, such as in the finisher, toward the end of the finishing reaction, or even after melt phase production is complete and prior to allowing the molten product to enter the die for making pellets. The polyamide may also be added as part of a polyolefin based nucleator concentrate where clarity is not critical such as in crystallized thermoformed articles.

Any one of the following methods for making the polyester composition of the invention, including concentrates, can be employed:

(i) the polyamide can be added during melt phase manufacture of the polyester polymer such that the product withdrawn from the melt phase polycondensation reactor made into a pellet contains the polyamide polymer; or (ii) an amorphous polyester pellet can be melt blended with a polyamide polymer and, after optional crystallization and solid stating, offered as a finally formulated pellet containing the same concentration of polyamide polymer as present in the finished product such that a converter need only feed the finally formulated pellets through an extruder without a step of separately metering a polyamide stream;

(iii) same as method (ii), except that the amorphous polyester pellets are first solid stated after which they are melt blended with the polyamide in an extruder to make pellets, the pellets which are later fed through an extruder by a converter to make articles; or (iv) a concentrate can be made by the method of (ii) or (iii) to allow a converter/compounder to meter and let down the concentrate into the polyester stream of pellets fed to an extruder for making articles at a rate corresponding to the final desired concentration of polyamide in the article; or (v) a salt and pepper blend of polyamide pellets and polyester pellets, one or both optionally ground, can be prepared and then fed as a pellet blend to an extruder such as an injection molding machine.

In each case, the polyamide polymer can be added to the polyester polymer as a neat stream of polyamide polymer, in a suitable liquid carrier, or melt blended with a polyester to provide a solid concentrate. The number average molecular weight of the polyamide polymer is not particularly limited to effectuate a measure of oxygen scavenging, provided that the relationship of C+A is 0.17 meq/g of polyamide polymer or more. The Mn is desirably above 1000, or above 3000. Higher or lower molecular weight polyamide polymers are suitable, such as polyamide polymers having a molecular weight of up to about 15,000, or up to 11,500, or 10,000 or less, and even 7500 or less.

Independent of the aforementioned molecular weights, in another alternative embodiment, the particular polyamide polymer used has a molecular weight below a film forming molecular weight. The characteristics of a polyamide polymer having a molecular weight at or above a film forming molecular weight is that a 0.1 mm thick casting of the polymer will bend 180° on itself without cracking, is self supporting, and can be taken up on a roll while maintaining its mechanical integrity. 0.1 mm thick polyamide polymer castings having a number average molecular weight below a film forming molecular weight will not bend 180° on itself without cracking or forming a permanent crease.

The end-groups of the polyamide polymer comprise carboxylic acid groups and/or hydrocarbyl groups, and some primary amine groups. The C:A end group concentration ratio is 2:1 or more, wherein C represents the cumulative total of a carboxylic acid residue end group concentration and a hydrocarbyl residue end group concentration, and A represents an amine residue end group concentration. Suitable ratios include 4:1 or more, or 10:1 or more, or 30:1 or more, or 50:1 or more, or 100:1 or more, or 200:1 or more. All else being equal, the particular ratio chosen depends on how long the induction period should last, with the lower ratios extending the induction period and the higher ratios shortening the induction period. The length of the induction period can be set as desired.

The polyamide polymer also has a C+A terminal group concentration of at least 0.17 meq/g of polyamide polymer. Since it is desired to have a period of time lapse between the manufacture of the article and the onset of significant oxygen scavenging, the polyamide polymer should have a total end group concentration, counting up all the C groups and the A groups, of at least 0.17 meq/g. It is believed that the induction period is too short, on the order of less than a few days, when the total number of terminal end groups falls below 0.17, especially at high C:A ratios and at higher levels of polyamide polymer. By retaining the total number of terminal end groups C+A at 0.17 meq/g or more, even at lower C:A ratios, an induction period can be provided. One may set the C:A ratio to correspond with an induction period tailing off and significant active oxygen scavenging commencing at about the time the container is filled with the consumable contents or shortly thereafter. For example, significant active oxygen scavenging can commence 35 days after the container is made, or within 1 week before filling the package up to about 2 weeks after filling the package. This may be accomplished by experimentally determining the appropriate C:A ratio for a given polyamide in the polyester resin into which the polyamide is added while ensuring that the total C+A content remains above 0.17 meq/g. In this embodiment, significant oxygen scavenging is attained when the oxygen transmission rate falls below 0.020 cc STP/day from the time the bottle is blow molded.

The polyamide polymer component (B) is made by reacting a polycarboxylic acid compound and either a polyamine compound, an amine functionalized polyalklydiene, or an amine functionalized polyoxyalkylene polyether, or made by any other known methods, such as through lactams, using amino acids, or acid chloride reaction products with diamines. The polyamide polymer desirably contains an active methylene hydrogen such as benzylic hydrogens, allylic hydrogens, or oxyalkylene hydrogens, to ensure effective and optimal oxygen scavenging activity.

In one embodiment, the polyamide polymer is a reaction product containing moieties, preferably in an amount of at least 40 mole %, or at least 70 mole %, or at least 80 mole %, represented by the general formula:

and the number of such moieties present in the polymer ranges from 1 to 200, or from 50 to 150. Preferably, at least 10 wt % of the monomers used to prepare the polyamide contain active methylene groups, such as an allylic group, an oxyalkylene hydrogen, or more preferably at least 50% of the repeat units in the polymer contain a benzylic hydrogen group.

Examples of acids used to make the polyamide include polycarboxylic acid compounds, amino acids, and chlorides, derivates or anhydrides thereof, including lactams, having from 4 to 50 carbon atoms, or an average of 4 to 24 carbon atoms, or an average of 4 to 12 carbon atoms. Examples of amines used to make the polyamide polymer include polyamines, amino acids, and the derivatives and anhydrides thereof, including lactams, having from to 50 carbon atoms, or from 2 to 22 carbon atoms.

More specific examples of suitable acids include adipic acid, isophthalic acid, terephthalic acid, 1,4-cyclohexanedicarboxylic acid, resorcinol dicarboxylic acid, naphthalene-2,6-dicarboxylic acid, derivates thereof, tartaric acid, citric acid, malic acid, oxalic acid, adipic acid, malonic acid, galactaric acid, 1,2-cyclopentane dicarboxylic acid, maleic acid, fumaric acid, itaconic acid, phenylmalonic acid, hydroxyphtalic acid, dihydroxyfumaric acid, tricarballylic acid, benzene-1,3,5-tricarboxylic acid, 1,2,4-benzene tricarboxylic acid, isocitric acid, mucic acid, glucaric acid, succinic acid, glutaric acid, suberic acid, azelaic acid, sebacic acid, decanedicarboxylic acid, isophthalic acid, pimelic acid, brassylic acid, thapsic acid, glutaconic acid, a-hydromuconic acid, [bgr]-hydromuconic acid, a-butyl-a-ethyl-glutaric acid, diethylsuccinic acid, hemimellitic acid, benzophenone tetracarboxylic dianhydride, chlorendic anhydride, hexahydrophthalic anhydride, tetrahydrophthalic anhydride, trimellitic anhydride, alkanyl succinic anhydride, 5-sodiosulfoisophthalic acid, 5-lithiosulfoisophthalic acid, the unsaturated acids and dimerized or trimerized fatty acids, including those found in natural sources such as Borage Oil, Flaxseed oil, and Primrose oil, lactams such as caprolactam, enantholactam, laurolactam, amino acids such as 6-aminocaproic acid, 7-aminoheptanoic acid, 9-aminononanoic acid, 11-aminoundecanoic acid, 12-aminododecanoic acid, and mixtures of two or more thereof.

The dicarboxylic acids may be used either individually or mixed with one another. The free dicarboxylic acids may also be replaced by the corresponding dicarboxylic acid derivatives, for example dicarboxylic acid esters of alcohols having from 1 to 4 carbon atoms or dicarboxylic anhydrides or dicarboxylic acid chlorides.

More examples of polyamines useful in the practice of the invention are those represented by the formula:

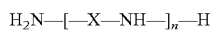

wherein n is a nominal integer ranging from 1 to 10; and X is a divalent 1-500 carbon atom moiety comprised of a saturated or unsaturated, branched or unbranched hydrocarbon radical, one or more aryl or alkaryl groups, or one or more alicyclic groups. X can be a lower alkylene radical having 1-22, or 2-8, carbon atoms.

Suitable aliphatic polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included. More specific examples include ethylene diamine, di(trimethlyene) triamine, diethylene triamine, di(heptamethylene) triamine, triethylene tetramine, tripropylene triamine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine, octamethlyene diamine, pentaethylene diamine, decamethylene diamine, and the like.

Cycloaliphatic polyamines include isophoronediamine, 4,4'-diaminodicyclohexylmethane, menthane diamine, 1,2-diaminocyclohexane, 1,4-diaminocyclohexane; and aromatic amines such as p- and m-xylylenediamine, 4,4'-methylenedianiline, 2,4-toluenediamine, 2,6-toluenediamine, polymethylene polyphenylpolyamine; 1,3-bis(aminomethyl)benzene, 1,3-phenylenediamine and 3,5-diethyl-2,4-toluenediamine.

Hydroxy polyamines, e.g., alkylene polyamines having one or more hydroxyalkyl substituents on the nitrogen atoms, are also useful in preparing the polyamide polymer of the invention. Examples include hydroxyalkyl-substituted alkylene polyamines in which the hydroxyalkyl group has less than about 10 carbon atoms. Examples of such hydroxyalkyl-substituted polyamines include N-(2-hydroxyethyl)-ethylenediamine, N,N'-bis(2-hydroxyethyl)ethylenediamine, monohydroxypropyl-substituted diethylene triamine, dihydroxypropyltetraethylenepentamine and N-(3-hydroxybutyl)tetramethylenediamine. Higher homologs obtained by condensation of the above-illustrated hydroxyalkyl-substituted alkylene amines through amino radicals or through hydroxy radicals are likewise useful.

Suitable aromatic polyamines include p- and m-xylylene diamine, methylene dianiline, 2,4-toluenediamine, 2,6-toluenediamine, polymethylene polyphenylpolyamine, and mixtures thereof. Higher homologs, obtained by condensing two or more of the above-illustrated alkylene amines, are also useful.

Mixtures of two or more of any of the above mentioned polyamines may be used to react with the polycarboxylic acid. It is to understood that practically any polyamine composition used to react with the polycarboxylic acid will not be 100% pure, and will most likely contain reaction by-products with the identified amine being the predominant compound in the composition. The same can be said for the polycarboxylic acid composition, although a 100% pure composition can be included as well.

Other groups related to the amide group formed by the reaction between the carboxyl group and the polyamine that are within the meaning of the term amide include the imides and the amidines.

Most preferably, the polyamide polymer contains active methylene groups, such as may be found on allylic group hydrogen atoms, benzylic group hydrogens, and alpha oxyalkylene hydrogens. Such hydrogen atoms may be expressed in the following respective structural moieties as being linked to the carbons illustrated in bold:

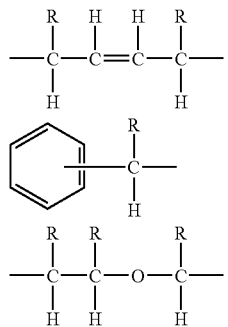

wherein R is a hydrogen or an alkyl group. These groups may be incorporated into the polyamide using polyamines or polycarboxylic acid compounds containing one or more of such active methylene groups.

Amine functionalized polyoxyalkylene polyethers can be made by conventional techniques, and are usually the reaction products of polyamine compounds with a polyoxyalkylene polyether polyol. Examples of suitable polyoxyalkylene polyether polyols are those having a number average molecular weight of 800 to 12,000, they may be block or random or block/random copolymers, or homopolymers, obtained by polymerizing alkylene oxides with polyhydric alcohols or polyamines as the initiator. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

The alkylene oxides may be added to the initiator, individually, sequentially one after the other to form blocks, or in mixture to form a heteric polyether. The polyalkylene polyether polyols may have either primary or secondary hydroxyl groups. It is preferred to use, as the alkylene oxides, propylene oxide, butylene oxide, or tetrahydrofuran. Preferred polyols also include, however, those containing or terminated with ethylene oxide in the amount from 1 to 30 weight percent. Included among the polyether polyols are polyoxyethylene glycol, polyoxypropylene glycol, polyoxybutylene glycol, polytetramethylene glycol; block copolymers, for example combinations of polyoxypropylene and polyoxyethylene, poly-1,2-oxybutylene and polyoxyethylene polyols, poly-1,4-tetramethylene and polyoxyethylene polyols or polyoxypropylene polyols; and copolymer polyols prepared from blends or sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459.

Suitable initiator molecules include aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di, and trialkanolamines, ethylene diamine, propylene diamine, diethylenetriamine, methylamine, triisopropanolamine, 1,3-diaminopropane, 1,3-diaminobutane, and 1,4-diaminobutane; trimethylolpropane, glycerine, sucrose, sorbitol, ethylene glycol, propylene glycol, dipropylene glycol, pentaerythritol, and 2,2-bis(4-hydroxyphenyl)-propane.

Suitable polyamine and polycarboxylic acid compounds for functionalizing the polyoxyalkylene polyether polyols include any of the aforementioned polyamine or polycarboxylic acid compounds.

Suitable amine and carboxylic acid functionalized polyalkylenedienes are available commercially as HYCAR reactive liquid polymers from Hanse Chemie. Examples of polyalkylenedienes are those obtained by polymerizing diene compounds, such as 1,4-butadiene; 1,2-butadiene; 1,4-isoprene; 3,4-isoprene; 2,3-dimethyl butadiene; chloroprene; 2,3-chloroprene; allene; and 1,6-hexatriene.

The polyamides can be obtained by using synthetic procedures that are well known in the art. Polyamides are generally prepared by melt phase polymerization from a diacid-diamine complex which may be prepared either in situ or in a separate step. In either method, the diacid and diamine (which includes any of the functionalized polyethers and polyoxyalklyenedienes) are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature.

Synthetic methods to make a polyamide polymer with carboxylic acid terminal groups include using an excess of the polycarboxylic acid compound in a reaction between the polyamine compound and the polycarboxylic acid compound. The molar excess of polycarboxylic acid can be combined with the polyamine prior to the onset of polymerization reaction. Alternatively, a carboxylic acid terminated polyamide polymer can be made by reacting together any desired molar ratio of polycarboxylic acid compound with a polyamine compound, such as a equimolar ratio or even an excess of the polyamine compound, and upon substantial completion of the reaction, adding a polycarboxylic acid compound to chain terminate the primary amine with carboxylic acid end groups.

Synthetic methods to make a polyamide polymer end capped with a hydrocarbyl group include, but are not limited to, a two step process comprising reacting together any desired molar ratio of polycarboxylic acid compound with a polyamine compound, such as a equimolar ratio or even an excess of the polyamine compound, and upon completing this reaction to a desired degree, which may be less than completion up to substantial completion, then in a second step adding the hydrocarbyl compound having a group reactive with an amine to chain terminate the primary amine groups with hydrocarbyl end groups. In like manner, a stoichiometric excess of the polycarboxylic acid compound may be reacted with the polyamine compound, followed by adding a hydrocarbyl compound having a group reactive with the carboxylic acid groups to chain terminate the carboxylic acid groups in part or wholly with hydrocarbyl groups.

Alternatively, the polyamine compound, the polycarboxylic acid compound, and the hydrocarbyl compound may be added to a reaction vessel followed by reacting together these reactants randomly in one step instead of following a two step process. Alternatively, a polyamide polymer containing carboxylic acid end groups or hydrocarbyl end groups can be made by reacting a high molecular polyamide under high shear in an extruder in the presence of a hydrocarbyl capping agent reactive with amine groups to obtain a predominately carboxyl and/or hydrocarbyl terminated polyamide polymer.

In any of these synthetic methods, the ingredients can be mixed together and reacted. However, in the course of making a carboxylic acid terminated polyamide compound, it is preferable to add a stream of polyamine compounds to the complete or substantially complete quantity of the polycarboxylic acid compounds so as to react out the primary amine functional groups.

These reactions may be carried out in the presence of absence of solvents or catalysts. A useful solvent, if used, is simply water. Conventional catalysts may be used to prepare the polyamides of the invention. Such catalysts are described in Principles of Polymerization" $4^{th}$ ed by George Odian 2004; "Seymour/Carraher's Polymer Chemistry" $6^{th}$ ed rev and expanded 2003; and "Polymer Synthesis: Theory and Practice" $3^{rd}$ ed by D. Braun 2001.

The polycarboxylic acid and/or hydrocarbyl compounds may be reacted with the polyamine compound at elevated temperatures, suitably at temperatures ranging from about 120° C. to about 170° C. for a time sufficient to substantially complete the reaction, usually from about 4 to about 12 hours. The reaction can be controlled by applying pressure. If the reaction proceeds with some difficulty, vacuum may be applied during the course of the reaction or towards the end of the reaction to drive toward completion and further molecular weight build up.

As noted above, hydrocarbyl capping agents can be added during the course of polyamide synthesis at any desired stage, such as at reaction initiation, after half the reaction is completed, or when about 90% or more of the reaction is complete.

The hydrocarbyl capping agents are those compounds having one functional group capable of reacting with either a primary or secondary amine, or having one functional group capable of reacting with a carboxylic acid group, and no additional functional groups reactive with a primary or secondary amine or a carboxylic acid group under the polymerization conditions actually used. The hydrocarbyl capping agents, upon reaction through the functional group, contain carbon, hydrogen, and optionally oxygen atoms making up the end group.

Examples of hydrocarbyl capping agents include compounds, oligomers, and polymers having one carboxylic acid group, anhydrides carboxylic acids, one glycidyl group, or one amine group; to which each are linked through a covalent bond a hydrocarbon containing carbon and hydrogen atoms, and optionally oxygen atoms (e.g. ether linkages, hydroxyl groups). Hydrocarbyl capping agents include monocarboxylic acid compounds, the various anhydrides, mono-glycidyl compounds and mono-amine compounds, their oligomers, and their polymers.

Suitable monocarboxylic acid compounds include aliphatic, alicyclic, aryl, or alkaryl acids. The number of carbon atoms is not particularly limited, and can include those acids having from 1 to 500 carbon atoms, but more typically will have from 1 to 24 carbon atoms. The monocarboxylic acid may be substituted or unsubstituted, saturated or unsaturated, branched or unbranched.

Examples include the substituted or un-substituted benzoic acids, substituted or un-substituted naphthalenic acids, substituted or un-substituted phenolic acids, acetic acid, formic acid, propionic acid, butyric acid, caproic acid, glycolic acid, lactic acid, mandelic acid, stearic acid, pentanoic acid, 2-chloropropionic acid, 3-chloropropionic acid, 2,2-dichloropropionic acid, hexanoic acid, 2-ethyl-hexanoic acid, cyclohexanecarboxylic acid, dodecanoic acid, palmitic acid, oleic acid, 3-mercapto-propionic acid, ricinoleic acid, 4-methylbenzoic acid, salicylic acid anthranilic acid, heptanoic acid, octanoic acid, decanoic acid, undecanoic acid, and octanoic acid.

Also included are aliphatic, branched or unbranched, saturated or unsaturated, mono-carboxylic acid capping polymers having from 25 to 600 carbon atoms. Examples of such polymers include the polyoxyalkylene polyether polymers having a carboxylic acid group. Examples of suitable oxyalkylene groups are those derived from ethylene oxide, propylene oxide, butylene oxide, or mixtures thereof, in random order or as block copolymers.

Examples of monoglycidyl compounds include aliphatic, alicyclic, or aromatic compounds attached to a monoglycidyl functional group. These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), epoxy ethers of monovalent phenols such as phenol, cresol, and other phenols substituted in the o- or p-positions with C (1)-C (21)branched or unbranched alkyl aralkyl, alkaryl, or alkoxy groups such as nonylphenol; glycidyl esters of mono-carboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoglycidyl compounds include alkyl glycidyl ethers with 1-18 linear carbon atoms in the alkyl chain such as butyl glycidyl ether or a mixture of C8-C14 alkyls, cresyl glycidyl ether, phenyl glycidyl ether, nonylglycidyl ether, p-tert-butylphenylglycidyl ether, 2-ethylhexyl glycidyl ether, and the glycidyl ester of neodecanoic acid.

Suitable mono-amine compounds include those having one primary amine group and a hydrocarbyl group having from 1-1000 carbon atoms. Examples include 4-phenylbenzyl amine, benzyl amine, butyl amine, sec-butylamine, cyclohexylamine,decylamine, dodecylamine, ethylamine, heptylamine, hexylamine, isopropylamine, p-methoxybenzylamine, 2-methoxyethylamine, methylamine,octadecylamine, octylamine, pentylamine, phenethylamine1-phenylethylamine, propylamine, tetradecylamine, 2-aminomethylpyridine, 4-aminomethylpyridine, aminodiphenylmethane, stearyl amine, and polyoxyalkylene monoamines such as those obtained under the trademark JEFFAMINE® M series, and salts thereof. Primary aromatic amines include; aniline, (m,p,o)-anisidine,(m,p,o)-bromoaniline,(m,p,o)-chloroaniline, 2,4-dichloroaniline, 2,5-dichloroaniline, 2,5-dimethoxyaniline, 2,4-dimetylaniline, 2,5-dimethylaniline, 2,6-dimethylaniline, p-ethylaniline, p-iodoaniline, (m,p,o)-nitroaniline, m-phenoxyaniline, propylaniline, (m,p,o)-toluidine, 2,4,6-tribromoaniline,and 2,4, 6-trichloroaniline, and salts thereof. Hetrocyclic amines include; 2-aminopyridine, 3-aminopyridine, 3-aminoquinoline, 8-aminoquinoline, and salts thereof.

Preferred polyamide polymers are those obtained from a reactant containing a benzylic hydrogen, from a viewpoint of their commercial availability, cost, and performance, preferred polyamides are obtained from a reactant containing a xylylene moiety, or a m-xylylene moiety, or a polymer containing any one of these residues in the polymer chain. More preferred examples include poly(m-xylylene adipamide) modified or unmodified polyamide, and a poly(m-xylylene adipamide-co-isophthalamide) modified or unmodified polyamide, each of which may be chain terminated with a hydrocarbyl capping agent such as those listed above, or modified with any other reactant, including those identified above.

Component (C) is a oxygen scavenging transition metal catalyst active for oxidizing an oxidizable component, such as a polyamide. The catalyst may or may not be consumed in the oxidation reaction, or if consumed, may only be consumed temporarily by converting back to a catalytically active state. As noted in U.S. Pat. No. 5,955,527, incorporated fully herein by reference, a measure of the catalyst may be lost in side reactions, or the catalyst may be viewed as an initiator "generating free radicals which through branching chain reactions lead to the scavenging of oxygen out of proportion to the quantity of "catalyst"".

Examples include cobalt added in the +2 or +3 oxidation state, rhodium added in the +2 oxidation state, and copper added in the +2 oxidation state. The metals may be added in salt form, most conveniently as carboxylate salts, such as cobalt octanoate, cobalt acetate, or cobalt neodecanoate.

The amount of catalyst in the polyester composition is effective to actively scavenge oxygen. It is desirable to provide sufficient amounts of oxygen scavenging transition metal catalyst to see significant scavenging effects, and this amount will vary between different transition metals and also depend upon the degree of scavenging desired or needed in the application.

While amounts ranging from about 10 ppm to 1000 ppm are suitable, for most applications, little if any effect is expected to be seen using amounts toward the lower end of the range between 10 ppm and 30 ppm. In a preferred embodiment, the amount of oxygen scavenging transition metal catalyst is at least 50 ppm, or at least 60 ppm, or at least 75 ppm, or at least 100 ppm. Amounts greater than about 400 ppm, while continuing to be effective, are not expected to provide an incremental improvement sufficient to justify added costs. The reported amounts are based on the weight of the polyester polymer composition and measured on the metal, not its compound weight as added to the composition. In the case of cobalt as the oxygen scavenging transition metal, preferred amounts are at least 50 ppm, or at least 60 ppm, or at least 75 ppm, or at least 100 ppm, or at least 125 ppm. The catalyst can be added neat or in a carrier (such as a liquid or wax) to an extruder or other device for making an article, or it can be added in a concentrate with a polyamide polymer, in a concentrate with a polyester polymer, or in a concentrate with a polyester/polyamide blend.

The polyester composition of the invention now allows one to not only decrease the induction period significantly compared with low molecular weight amine terminated polyamide formulations, and to control the induction period, but in another embodiment, the oxygen transmission rate per day can also be significantly reduced. The oxygen transmission rate per day can be advantageously reduced in the absence of nanocomposite clays or silicates, thereby reducing resin composition costs.

The life of active oxygen scavenging using the composition of the invention is quite long once significant active oxygen scavenging has commenced. In the polyester polymer compositions of the invention, active oxygen scavenging can continue for at least 180 days, and even 360 days or more, preferably continuously below 0.01 cc STP/day.

In another embodiment, for a continuous period of 50 days measured at any time within a period after the manufacture of a blow molded polyester container and before 100 days after its manufacture, the oxygen transmission rate of oxygen through the bottle does not exceed 0.020 cc STP/day, preferably does not exceed 0.010 cc STP/day, and even does not exceed 0.005 cc STP/day. Preferably, the 50 day continuous period begins within 35 days after blow molding the polyester container, or begins within 15 days after making the blow molded container.

In yet another embodiment, there is provided a blow molded polyester bottle having an oxygen transmission rate of 0.020 cc STP/day or less, more preferably 0.010 cc STP/day or less, for a continuous period of 40 days at any time within a period when the bottle is manufactured and 100 days thereafter, preferably 80 days thereafter, wherein the bottle comprises an oxygen scavenging oxygen scavenging transition metal, preferably cobalt, in an amount of 50 ppm to 300 ppm or less, and a polyamide having a C:A ratio of 2:1 or more and a total C+A terminal group concentration of at least 0.17 meq/g. Preferably, the 40 day period commences later than 7 days after the bottle is made, and more preferably begins 10 days after making the container.

The container using the polyamide polymers of the invention are capable of continuously sustaining these low transmission rates even beyond 40 or 50 days, such as for a period of 100 days, or 160 days, and even for 365 days. Of course, the measurement period would be adjusted accordingly to accommodate the extended test period. Furthermore, the polyester polymer compositions are capable of providing a combination of sustained and continuous periods of low oxygen transmission rates and short induction periods.

The test conditions for measuring the oxygen transmission rate in the case of comparing an acid or hydrocarbyl terminated polyamide polymer to a low molecular weight amine terminated polymer are not particularly limited, since benefits can be seen under a wide range of test conditions relative to the low molecular weight amine terminated polyamide compound, provided that the testing conditions are the same whenever a comparison is made. The test conditions used for measuring the oxygen transmission rate where relative values are not used, such as in the two embodiments immediately above, are as follows:

The oxygen transmission rate tests were performed using 25 gram, 20 ounce stretch blow molded bottles which had a sidewall thickness of about 0.011 (plus or minus 0.0015) inches (0.028 cm plus or minus 0.0038 cm). The 20 ounce bottles were fitted the day following blow molding for oxygen package transmission testing. Prior to measurement, the bottle is sealed by gluing it to a brass plate that is connected to a 4 way valve over the finish. This mounting technique seals the bottle, while allowing for control of test gas access. The mounting is assembled as follows. First a brass plate is prepared by drilling two ⅛ inch holes into the plate. Two lengths of ⅛ soft copper tubing (which will be designated A and B) are passed through the holes in the plate and the gaps between the holes and the tubes are sealed with epoxy glue. One end of each of these tubes is attached to the appropriate ports on a 4-way ball valve (such as Whitey model B43YF2). Tubing (which will be designated C and D) and connections are also attached to the other ports of the ball valve to allow the finished assembly to be connected to an Oxtran oxygen permeability tester (Modern Control, Inc. Minneapolis, Minn.). This mounting is then glued to the finish of the bottle to be tested so that tubes A and B extend into the interior of the bottle. The open end of one tube is positioned near the top of the package and the open end of the other is positioned near the bottom to ensure good circulation of the test gas within the bottle. Gluing is typically performed in two steps using a quick setting epoxy to make the initial seal and temporarily hold the assembly together and then a second coating of a more rugged Metalset epoxy is applied. If desired the brass plate may be sanded before mounting to clean the surface and improve adhesion. If the 4 tubes are correctly connected to the 4-way valve, then when the valve is in the "Bypass" position, tubes A and B communicate and tubes C and D communicate, but tubes A and B do not communicate with tubes C and D. Thus the package is sealed. Similarly, when the valve is in its "Insert" position, tubes A and D communicate and tubes B and C communicate, but A and D do not communicate with tubes B and C, except through the interior of the bottle. Thus the bottle can be swept with purge or test gas.

Once the bottle is mounted on the assembly, it is swept with an oxygen-free gas, and the conditioning period begins. After several minutes of purging, the 4-way valve is moved to the Bypass position, sealing the bottle. At that point the entire bottle and mounting assembly may be disconnected from the purge gas supply without introducing oxygen into the interior of the bottle. Typically 3 bottles of each formulation were mounted for testing.

When the oxygen transmission rate of the bottle is to be tested, it is placed inside an environmental chamber. Under normal operation these chambers control the external conditions at 23° C. plus or minus 1° C. and 50% relative humidity plus or minus 10%. These chambers contain tubing connections to an Oxtran 1050 or Oxtran 1050A instrument and the mounting is connected to the Oxtran tester via tubes C and D. Carrier gas (nitrogen containing on the order of 1% hydrogen), which is humidified using a bubbler, is supplied to the instruments and the tubing in the environmental chamber. Both the Oxtran 1050 and 1050A use a coulometric sensor to measure oxygen transmission rates and both have positions for 10 samples to be mounted on the instrument at one time. Typically, 9 test bottles and 1 control package were run in a set. Once samples were mounted in the chamber, the 4-way valve is turned to the Insert position and the system is allowed to recover from the perturbation caused by this process.

After allowing the system to recover, the test is then begun by "inserting" the instrument sensor in-line. The test sequence is controlled by a specially written LabView™ software interface for the instrument. Basically, the instrument automatically advances through the test cells using a preset interval that allows the instrument to stabilize after each cell change as the test gas from the bottle mounted on the cell is routed through the coulometric sensor, generating a current. That current is passed through a resistor, which creates a voltage that is proportional to the oxygen transmission rate of the package plus the leak rate of that cell and package assembly. Typically the instrument is allowed to index through each of the cells 3 or more times and the average of the last 3 measurements is used. Once these readings are obtained, the 4-way valves are moved to their Bypass positions and this process is repeated, providing a measure of the leak rate for the cell and assembly. This value is subtracted from the value obtained for the package, cell and assembly to yield the value for the package. The value is corrected for the average barometric pressure in the laboratory and reported as the oxygen transmission rate (OTR) of the bottle (in cc(STP)of oxygen/day). At this point the test is terminated and the bottles are removed from the instrument (with the 4-way valves still in the Bypass position).

Between tests, bottles were stored at ambient (RH, lighting, barometric pressure) conditions in a lab (22° C. plus or minus 4° C.) with the interior isolated from air. After a period of time, the bottle is reconnected to the Oxtran and a new set of transmission measurements collected. In this manner, it is possible to monitor the behavior of the bottle over several weeks or months.

It was quite surprising to find that the polyamide polymers having a C:A ratio of 2:1 or higher and C+A greater than 0.17 meq/g, in polyester polymer compositions containing an oxygen scavenging transition metal catalyst, had remarkably better oxygen scavenging performance than the same compositions made with low molecular weight amine terminated polyamide polymers under the same test conditions, in the sense that the bottle made with the compositions of the invention exhibited significantly shorter induction times and preferably have lower overall oxygen transmission rates. The examples below illustrate this effect. In a preferred embodiment, the polyester resin compositions of the invention are less yellow as measured by bottle sidewall b* color than the same formulation made with predominately amine end capped polyamides. For example, the polyester resin compositions, such as preforms, containing a transition metal oxygen scavenging catalyst made with the predominately acid or hydrocarbyl end capped polyamides exhibit a bottle preform b* color of +3.0 or less, or +2.0 or less, or +1.0 or less, and even having a b* in the negative region.

The polymer composition of the invention can be used in multi-layered laminate barrier packaging. Such multi-layered packages, however, are expensive to make. An advantage of the invention is that both passive barrier to oxygen and active oxygen scavenging can be obtained in one layer. Accordingly, there is provided a mono-layer bottle comprising (A), (B), and (C) components.

The blends of the invention are useful as the polymer composition used to make and as found in moldings of all types by extrusion or injection molding, and for making thermoformed articles.

Specific applications include containers and films for packaging of food, beverages, cosmetics, pharmaceuticals, and personal care products where a high oxygen barrier is needed. Examples of beverage bottles include stretch blow molded and extrusion blow molded water bottles and carbonated soft drinks, but the application is particularly useful in bottle applications containing juices, sport drinks, beer or any other beverage where oxygen detrimentally affects the flavor, fragrance, performance (e.g. due to vitamin degradation), or color of the drink. The polymer blends are also particularly useful in food trays, such as dual ovenable food trays, or cold storage food trays, both in the base container and in the lidding (whether a thermoformed lid or a film), where the freshness of the food contents can decay with the ingress of oxygen. The polymer blends also find use in the manufacture of cosmetic containers and containers for pharmaceuticals or medical devices. Preferably, the polyester polymer composition, including the preforms, bottles, sheets, and all the other applications are either a monolayer, or contain components (A), (B), and (C) in one layer.

Many other ingredients can be added to the compositions of the present invention to enhance the performance properties of the blends. For example, crystallization aids, impact modifiers, surface lubricants, denesting agents, stabilizers, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

In applications where a clear, colorless resin is desired, the slight yellow color generated during processing can be masked by addition of a blue dye. The colorant can be added to either component of the blend during polymerization or added directly to the blend during compounding. If added during blending, the colorant can be added either in pure form or as a concentrate. The amount of a colorant depends on its absorptivity and the desired color for the particular application. A preferred colorant is 1-cyano-6-(4-(2-hydroxyethyl)anilino)-3-methyl-3H-dibenzo(F,I,J)-isoquinoline-2,7-dione used in an amount of from about 2 to about 15 ppm.

Other typical additives, depending on the application, also include impact modifiers. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition.

In many applications, not only are the packaging contents sensitive to the ingress of oxygen, but the contents may also be affected by UV light. Accordingly, it is also desirable to incorporate into the polyester composition any one of the known UV absorbing compounds in amounts effective to protect the packaged contents.

EXAMPLES

The inherent viscosity values described throughout this description to describe the pellet Ih.V. are set forth in dL/g units and is calculated from an 0.50 gram sample dissolved in 10 dL of a 60/40 wt/wt phenol/tetrachloroethane at 25° C. The It.V. can be calculated from the Ih.V. by the following equation:

$$It.V.=0.5*(e^{(0.5*Ih.V.)}-1)+0.75*Ih.V.$$

The method used to measure the terminal carboxyl group concentration is by potentiometric titration. One gram of polyamide is placed in 50 milliliters of benzyl alcohol and heated until dissolved. The titrant is 0.01 N potassium hydroxide in isopropanol.

Terminal amine group concentration is determined by potentiometric titration. One gram of polyamide is dissolved in 90 mls of m-cresol at 25° C. The titrant is 0.01 N perchloric acid in a ratio of 2:1 isopropanol/propylene glycol. The titrant is prepared from 70% perchloric acid in water.

The hydrocarbyl end group concentration, in meq/gm or milli moles/gm, is calculated by the number of moles of hydrocarbyl compound added to the polyamide polymerization reaction.

Example 1

This example illustrates the effect Components (B) and (C) on the color of a polyester composition made into a bottle.

Pellets of Voridian PET grade 9921W polyester polymer were blended with two versions of a polyamide of adipic acid and m-xylylene diamine, one version having carboxyl endgroups and the other version having amino endgroups.

The carboxyl terminated version (CT) was prepared by the following method:

In a 17 gallon stainless steel reactor vessel with a spiral agitator 33.17 lbs (110.73 moles) of m-xylylene diamine was added drop wise to a stirred mixture of 37.92 lbs (117.92 moles) of adipic acid and 63.6 lbs of water. The water was added to dissolve the salt and control the exotherm during its formation. A stoichiometric excess of 6.5 mole % acid was used to make about 60 lbs of a polyamide having an 0.29 Ih.V. The mixture was heated at 105° C. for 1 hour to remove the water. The temperature was then raised to 120° C. for 1 hour, and then to 135° C. for 0.5 hours, followed by 275° C. for 1 hour at atmospheric under nitrogen purge throughout the course of the reaction. The resulting melt was then extruded onto dry ice and ground to pass through a 6 millimeter screen.

The amine terminated version (AT) was prepared by the following method:

In a 17 gallon stainless steel reactor vessel with a spiral agitator, 29.44 lbs (98.27 moles) of m-xylylene diamine was added drop wise to a stirred mixture of 29.67 lbs (92.28 moles) of adipic acid and 53 lbs of water. The water was added to dissolve the salt and control the exotherm during its formation. A stoichiometric excess of 6.5 mole % amine was used to make 50 lbs of a polyamide having an Ih.V. of _ 0.438_dL/g. The mixture was heated at 105° C. for 1 hour to remove the water. The temperature was then raised to 120° C. for 1 hour, and then to 135° C. for 0.5 hours, followed by 275° C. for 1 hour at atmospheric under nitrogen purge throughout the course of the reaction. The resulting melt was then extruded onto dry ice an ground to pass through a 6 millimeter screen.

Both versions of the polyamides were of very low molecular weight, calculated to be about 3700 for the carboxyl terminated version and about 7500 for the amino terminated version based upon measured end group concentrations using the following calculation:

$$Mn=2*1000/(meq\ carboxyl/gm+meq\ amino/gm+meq\ hydrocarbyl/gm)$$

Where meq hydrocarbyl/gm=milli moles of hydrocarbyl/gram

TABLE 1

| Polyamide Type | Carboxyl Endgroup Concentration (meq/g) | Amino Endgroup Concentration (meq/g) | Inherent Viscosity | Calculated Mn |
|---|---|---|---|---|
| Carboxyl Terminated (CT) | 0.545 | 0.0042 | 0.29 | 3700 |
| Amino Terminated (AT) | 0.0446 | 0.221 | 0.44 | 7500 |

Pellet blends were made at 1, 3, and 5 wt. % polyamide in PET 9921W as listed in Table 2 below. The blends were made by grinding the polyamide polymers and the polyester polymers to 3 mm. The ground polyester polymers were dried at 150° C. overnight, and the ground polyamide polymers were dried at 80 C overnight. The ground polymers were then melt processed on a Brabender single screw extruder equipped with an Egan dispersive mixing screw at 275° C., screw speed at 100 rpm, to make pellet blends of the polyamide polymer and the polyester polymer.

Solely to initially determine the effect of the different polyamides on the color of the blends without the addition of a cobalt oxidation catalyst, the L*, a* and b*, were measured on the resulting pellets. The L*, a*, b* of the pellet blends were measured directly on the pellets in reflectance mode, specular included, according to the procedure described above.

The results are reported in Table 2.

TABLE 2

| Example # | 9921W w/ | HunterLab Pellet Color | | |
|---|---|---|---|---|
| | | L* | a* | b* |
| 1-A | Control | 61 | −1.46 | 0.37 |
| 1-B | w/1.0% CT | 61.85 | −2.09 | 2.96 |
| 1-C | w/3.0% CT | 64.06 | −2.37 | 4.2 |
| 1-D | w/5.0% CT | 65.14 | −2.42 | 4.57 |
| 1-E | w/1.0% AT | 60.6 | −3.74 | 8.87 |
| 1-F | w/3.0% AT | 61.56 | −3.55 | 8.17 |
| 1-G | w/5.0% AT | 62.57 | −3.59 | 8.35 |

As can be seen with the pellet color, a significant color improvement is observed when using a carboxyl terminated polyamide instead of an amino terminated polyamide. The indication of yellowness (b*) indicates a dramatic effect when changing polyamide endgroups. The carboxyl terminated version has 2.5-4.5 unit increase in yellowness whereas the amino terminated version has an increase of about 8.5 units. Also, the brightness of the blends (L*) was somewhat increased to a greater degree with increasing amounts of the carboxyl terminated polyamide compared with the amino terminated version.

Example 2

In this next set of experiments, the pellet blends of the polyamide pellets prepared according to the process described in Example 1 were combined with PET 9921W polyester pellets and cobalt as an oxygen scavenging transition metal catalyst according to the process described below, and then formed into a monolayer preform and stretch-blow molded bottles. The effects of the different polyamide polymers on the transmission rate of oxygen through the bottle wall and the induction period needed to commence significant oxygen scavenging were evaluated.

Dry blends were prepared using PET 9921W, commercially available from Eastman Chemical Company, 3.0 wt. % of the low molecular weight polyamide granules and pellets of a concentrate of cobalt catalyst in PET 9921. The catalyst concentrate was prepared by adding cobalt neodecanoate pellets to a PET 9921 melt stream on a twin screw extruder. The resulting pelletized concentrate contained about 3500 ppm Co. The mixture of PET 9921W, polyamide and catalyst concentrate (in PET 9921) was fed into a Husky Injection Molding Machine Type LX-160 having machine and manifold heat set points at about 280° C. and a cycle time of about 16 seconds to form a final composition containing 3 wt. % of the polyamide, 100 ppm cobalt, and the remainder being PET The total weight of pellets fed to the machine was about 30 lbs (13,620 grams). The molten stream was injection molded into monolayer preform molds suitable for forming 20 ounce bottles. The preforms were stored at ambient lab conditions overnight and then blown into bottles the next day on a Sidel SBO-2/3 stretch/blow machine. A set of comparative examples (control) were made which contained neither cobalt nor polyamide polymer.

The bottles were fitted the day following blow molding for oxygen package transmission testing using the procedure described above for measuring oxygen transmission rates on the Oxtran. Triplicate bottles from each type of blend were used for the testing and package oxygen transmission was measured on a semi-random basis for the next several months. Table 3 sets forth the OTR results for Control bottles made with the base polyester polymer without polyamide, polyester polymer made with 3 wt. % amine terminated polyamide containing 100 ppm Co, and polyester polymer made with 3 wt. % carboxylic acid terminated polyamide containing 100 ppm Co.

TABLE 3

Oxygen transmission rates of 25 gram, 20 oz bottles

| | PET 9921W Control (Without Polyamide and without cobalt) | | With 3 wt. % AT @ 100 ppm Co | | With 3 wt. % CA @ 100 ppm Co | |
|---|---|---|---|---|---|---|
| Days Since Blow Molding | OTR (cc STP/ day) | Bottle Sample | OTR (cc STP/ day) | Bottle Sample | OTR (cc STP/ day) | Bottle Sample |
| 4 | 0.0571 | 2 | 0.0399 | 3 | 0.0397 | 3 |
| 4 | 0.0585 | 1 | 0.0401 | 1 | 0.0374 | 2 |
| 4 | 0.0569 | 3 | 0.0391 | 3 | 0.0390 | 1 |
| 32 | 0.0549 | 3 | 0.0372 | 2 | 0.0006 | 2 |
| 36 | 0.0498 | 2 | 0.0360 | 1 | 0.0016 | 3 |
| 36 | — | — | 0.0371 | 3 | — | — |
| 41 | 0.0543 | 1 | — | — | 0.0017 | 1 |
| 53 | 0.0505 | 1 | — | — | 0.0014 | 1 |
| 64 | 0.0508 | 3 | 0.0274 | 1 | 0.0003 | 2 |
| 76 | — | — | 0.0202 | 2 | 0.0009 | 3 |
| 81 | — | — | 0.0159 | 3 | — | — |
| 97 | — | — | — | — | 0.0007 | 1 |
| 103 | — | — | 0.0201 | 3 | — | — |
| 109 | — | — | 0.0168 | 3 | — | — |
| 113 | — | — | — | — | 0.0008 | 3 |
| 120 | — | — | — | — | 0.0006 | 2 |
| 123 | — | — | 0.0137 | 3 | — | — |
| 123 | — | — | 0.0247 | 1 | — | — |
| 137 | — | — | 0.0212 | 2 | — | — |
| 158 | — | — | — | — | 0.0007 | 3 |
| 158 | — | — | — | — | 0.0007 | 1 |
| 165 | — | — | 0.0236 | 1 | — | — |
| 187 | — | — | 0.0298 | 1 | — | — |
| 268 | — | — | 0.0022 | 3 | 0.0009 | 2 |
| 353 | — | — | 0.0030 | 1 | — | — |
| 358 | — | — | 0.0057 | 3 | — | — |

The polyester composition containing the carboxyl terminated polyamide exhibited an induction period, defined as an oxygen transmission rate falling below 0.020 cc STP/day, of significantly less than 32 days. By contrast, the polyester composition containing the amino terminated polyamide exhibited an induction period of greater than 75 days. Thus, the induction period for polyester compositions containing the carboxyl terminated polyamide was about ¼ that of a polyester composition containing an amino terminated polyamide. Moreover, the polyester polymer composition containing the carboxyl terminated polyamide had an oxygen transmission rate of less than 0.010 cc STP/day for at least 230 consecutive days, and even was less than 0.005 cc STP/day for at least 230 consecutive days. By contrast, the polyester composition containing the amino terminated polyamide only attained an, oxygen transmission rate of less than 0.010 cc after 187 days.

Example 3

This example illustrates the effect of only 1 wt. % predominately acid terminated polyamide and 100 ppm Co on the oxygen scavenging capability of the composition relative to a composition containing a polyamide predominately amine terminated. Samples were prepared and treated as described in Example 2, except the polyamide level was adjusted to yield 1 wt. % in the final blend. The oxygen transmission rates determined for these bottles are presented in Table 4.

TABLE 4

Oxygen transmission rates of 25 gram, 20 oz bottles

| | PET 9921W Control (Without Polyamide) | | With 1 wt. % AT @ 100 ppm Co | | With 1 wt. % CA @ 100 ppm Co | |
|---|---|---|---|---|---|---|
| Days Since Blow Molding | OTR (cc STP/ day) | Bottle Sample | OTR (cc STP/ day) | Bottle Sample | OTR (cc STP/ day) | Bottle Sample |
| 4 | 0.0571 | 2 | 0.0473 | 1 | 0.0500 | 1 |
| 4 | 0.0585 | 1 | 0.0500 | 3 | 0.0482 | 2 |
| 4 | 0.0569 | 3 | 0.0507 | 2 | 0.0511 | 3 |
| 32 | 0.0549 | 3 | 0.0488 | 1 | — | — |
| 36 | 0.0498 | 2 | 0.0464 | 3 | 0.0491 | 2 |
| 36 | — | — | — | — | 0.0446 | 1 |
| 41 | 0.0543 | 1 | 0.0492 | 2 | 0.0417 | 3 |
| 53 | 0.0505 | 1 | 0.0478 | 2 | — | — |
| 64 | 0.0508 | 3 | 0.0465 | 1 | 0.0491 | 3 |
| 76 | — | — | 0.0435 | 3 | 0.0434 | 1 |
| 81 | — | — | — | — | 0.0445 | 2 |
| 95 | — | — | 0.0418 | 2 | — | — |
| 103 | — | — | 0.0406 | 1 | 0.0427 | 2 |
| 109 | — | — | 0.0396 | 1 | 0.0427 | 2 |
| 113 | — | — | — | — | 0.0381 | 3 |
| 113 | — | — | — | — | 0.0419 | 1 |
| 123 | — | — | 0.0432 | 2 | 0.0400 | 2 |
| 123 | — | — | — | — | 0.0424 | 1 |
| 152 | — | — | 0.0426 | 3- | 0.0391 | 1 |
| 158 | — | — | 0.0410 | 1 | — | — |
| 165 | — | — | 0.0436 | 2 | 0.0322 | 3 |
| 268 | — | — | — | — | 0.0317 | 2 |
| 374 | — | — | 0.0329 | 2 | 0.0250 | 3 |
| 377 | — | — | — | — | 0.0299 | 3 |

The results indicate that the oxygen transmission rate of the composition of the invention is slightly reduced after about 120 days relative to a composition containing amine terminated polyamides and one can begin to see some improvement even at even at low levels of polyamide and cobalt. To obtain the best results, however, larger quantities or polyamide, transition metal, or both are preferred.

Example 4

This example illustrates the effect of increasing the concentration of predominately acid terminated polyamide to 5 wt. % on oxygen transmission while retaining the same level of Co at 100 ppm, and further illustrates the effect relative to a composition containing a predominately amine terminated polyamide. Samples were prepared and treated as described in Example 2, except the polyamide level was increased to yield 5% in the final blend. The oxygen transmission rates determined for these bottles are presented in Table 5.

TABLE 5

Oxygen transmission rates of 25 gram, 20 oz bottles

| | PET 9921W Control (Without Polyamide) | | With 5 wt. % AT @ 100 ppm Co | | With 5 wt. % CA @ 100 ppm Co | |
|---|---|---|---|---|---|---|
| Days Since Blow Molding | OTR (cc STP/ day) | Bottle Sample | OTR (cc STP/ day) | Bottle Sample | OTR (cc STP/ day) | Bottle Sample |
| 4 | 0.0571 | 2 | 0.0313 | 2 | 0.0143 | 2 |
| 4 | 0.0585 | 1 | 0.0315 | 1 | 0.0141 | 1 |
| 4 | 0.0569 | 3 | 0.0324 | 3 | 0.0230 | 3 |
| 32 | 0.0549 | 3 | 0.0303 | 2 | 0.0006 | 3 |
| 36 | 0.0498 | 2 | 0.0223 | 1 | 0.0005 | 2 |
| 36 | — | — | 0.0249 | 3 | — | — |
| 41 | 0.0543 | 1 | — | — | — | — |
| 46 | — | — | — | — | 0.0010 | 2 |
| 53 | 0.0505 | 1 | — | — | — | — |
| 64 | 0.0508 | 3 | 0.0146 | 1 | 0.0006 | 3 |
| 76 | — | — | 0.0088 | 2 | 0.0009 | 1 |
| 81 | — | — | 0.0094 | 3 | 0.0 | |
| 95 | — | — | — | — | 0.0004 | 2 |
| 103 | — | — | 0.0142 | 1 | — | — |
| 113 | — | — | 0.0113 | 1 | — | — |
| 120 | — | — | 0.0181 | 2 | 0.0005 | 3 |
| 120 | — | — | 0.0184 | 3 | — | — |
| 123 | — | — | 0.0165 | 2 | — | — |
| 137 | — | — | 0.0151 | 3 | — | — |
| 137 | — | — | 0.0104 | 1 | — | — |
| 152 | — | — | — | — | 0.0003 | 2 |
| 152 | — | — | — | — | 0.0011 | 1 |
| 165 | — | — | 0.0147 | 2 | — | — |
| 165 | — | — | 0.0133 | 1 | — | — |
| 187 | — | — | 0.0112 | 3 | — | — |
| 268 | — | — | 0.0039 | 3 | — | — |
| 353 | — | — | Error | 2 | — | — |
| 358 | — | — | 0.0020 | 3 | — | — |

The results indicate that the induction time using carboxyl terminated polyamide is significantly less than when using the amine terminated polyamide. As early as day 4, the oxygen transmission rate for carboxyl terminated polyamide compositions was about ¼ that of the control. By day 32, the oxygen transmission rate had plummeted to 0.0006 cc STP/day, which was about 1/50 the transmission rate of the amine terminated polyamide composition. Even using the oxygen transmission rate at day 4, where the bottles with carboxyl terminated polyamide already exhibit evidence of oxygen scavenging, as a starting point, it took less than 32 days for oxygen transmission rate of the composition containing the carboxyl terminated polyamide to be reduced an additional 50%, compared to about 64 days for the amine terminated polyamide composition.

Once oxygen scavenging was activated, the oxygen transmission rate for the composition containing the carboxyl terminated polyamide remained at a very low level—less than 0.005 cc STP/day—over a period of at least 120 days. While the oxygen scavenging activity of the composition containing 5 wt. % CT was excellent, it is believed that using about no more than 3.5 wt. % of the carboxyl terminated polyamide is optimal because the similar performance can be achieved at low levels of 3 wt. %, while saving on material costs. (Compare Example 2)

Example 5

This example illustrates the effect of using a predominately acid terminated polyamide on b* color relative to the use of the same amount of a predominately amine terminated polyamide. In each case, the polyester composition made with a polyamide polymer and contained about 100 ppm Co metal, using the procedures and ingredients set forth in Examples 1 and 2. The b* was measured on the preform at the center of the sidewall having a thickness of about 144 mils according to the test method described above.

The results are provided below in Table 6. AT means amine terminated polyamide, and CT means carboxylic acid terminated polyamide.

TABLE 6

20 ounce preform color

| Reference | Description | b* color |
|---|---|---|
| A | Control | 4.4 |
| B | 1.0 wt. % AT | 14.82 |
| C | 3.0 wt. % AT | 4.13 |
| D | 4.8 wt. % AT | −6.12 |
| E | 1.0 wt. % CT | −0.83 |
| F | 3.0 wt. % CT | −5.62 |
| G | 5.0 wt. % CT | −9.8 |

The b* color of compositions containing the carboxylic acid terminated polyamide and cobalt was much lower than equivalent compositions containing the amine terminated polyamide. With these compositions, blue or neutral bottles can be made with lower amounts of bluing toners since the b* color values were much less than the compositions containing the amine terminated polyamide.

Many variations will suggest themselves to those skilled in this art in light of the above detailed description. All such obvious modifications are within the full intended scope of the appended claims.

What is claimed is:

1. A polyester polymer composition comprising
   (A) a polyester polymer comprising:
      (i) a polycarboxylic acid component comprising at least 60 mole % of the residues of terephthalic acid, derivates of terephthalic acid, naphthalene-2,6-dicarboxylic acid, derivatives of naphthalene-2,6-dicarboxylic acid, or mixtures thereof, and
      (ii) a polyhydroxyl component comprising at least 30 mole % of the residues of $C_2$-$C_4$ aliphatic saturated diols,
   based on 100 mole percent of the polycarboxylic acid compound residues and 100 mole percent polyhydroxyl compound residues in the polyester polymer, respectively;
      (B) a polyamide polymer obtained from a reactant containing an allylic hydrogen atom, wherein the polyamide polymer is in an amount ranging from 0.10% wt. % to 10.0 wt. %, based on the weight of (A) and (B), having a C:A terminal group concentration ratio of 2:1 or more and a C+A terminal group concentration of at least 0.17 meq/g of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide; and
      (C) an oxygen scavenging transition metal catalyst.

2. The composition of claim 1, wherein the reactant comprises a poly(1,4-butadiene) moiety or a poly(1,2-butadiene) moiety.

3. A polyester polymer composition comprising:
   (A) a polyester polymer comprising:
      (i) a polycarboxylic acid component comprising at least 60 mole % of the residues of terephthalic acid, derivatives of terephthalic acid, naphthalene-2,6-dicarboxylic acid, derivatives of naphthalene-2,6-dicarboxylic acid, or mixtures thereof, and
      (ii) a polyhydroxyl compound component comprising at least 30 mole % of the residues of $C_2$-$C_4$ aliphatic saturated diols,
   based on 100 mole percent of the polycarboxylic acid residues and 100 mole percent polyhydroxyl compound residues in the polyester polymer; and
      (B) a polyamide polymer in an amount ranging from 10% wt. % to 50.0 wt. %, based on the weight of (A) and (B), having a C:A terminal group concentration ratio of 50:1 or more and a C+A terminal group concentration of at least 0.17 meq/g of polyamide polymer, wherein C represents a cumulative total of a terminal carboxyl group concentration and a terminal hydrocarbyl group concentration expressed in meq/g of polyamide, and A represents a terminal amine group concentration expressed in meq/g of polyamide.

4. The composition of claim 3, wherein the polyester polymer comprises:
   (i) a polycarboxylic acid component comprising at least 85 mole % of the residues of terephthalic acid or its derivatives or mixtures thereof; and
   (ii) a polyhydroxyl compound component comprising at least 85 mole % of the residues of ethylene glycol
based on 100 mole percent of the polycarboxylic acid residues and 100 mole percent polyhydroxyl compound residues in the polyester polymer.

5. The composition of claim 4, wherein said composition is combined with additional polyester polymer, followed by blow molding into a bottle, and for a continuous period of 50 days measured at any time within a period after the manufacture of a blow molded bottle and before 100 days after its manufacture, the oxygen transmission rate of oxygen through the bottle does not exceed 0.020 cc STP/day.

6. The composition of claim 3, wherein the number average molecular weight of the polyamide is 10,000 or less.

7. The composition of claim 6, wherein the 50 day continuous period begins within 35 days after making the blow molded bottle.

8. The composition of claim 3, wherein the polyamide comprises a partially aromatic polyamide having a number average molecular weight of 7,500 or less.

9. The composition of claim 8, wherein the C:A ratio is 100:1 or more.

10. The composition of claim 3, wherein the oxygen transmission rate does not exceed 0.010 cc STP/day.

11. The composition according to claim 3, wherein said polyamide comprises a compound having benzylic hydrogen atoms.

12. The composition according to claim 3, wherein said polyamide contains a xylylene moiety.

13. The composition according to claim 3, wherein the polyamide comprises poly (m-xylylene adipamide).

* * * * *